though in some cases complete reaction has been found to occur at room temperature. Usually it is preferable to heat the reaction mixture to substantial completion.

United States Patent Office

2,699,442
Patented Jan. 11, 1955

2,699,442

PREPARATION OF PHTHALOCYANINE PIGMENTS

John W. Eastes, Ridley Park, Pa., and Theodore F. Cooke, Martinsville, N. J., assignors to American Cyanamid Company, New York, N. Y., a corporation of Maine No Drawing. Original application January 8, 1952, Serial No. 265,522. Divided and this application November 2, 1953, Serial No. 389,852

6 Claims. (Cl. 260—314.5)

This invention relates to the preparation of improved phthalocyanine pigments and more particularly to an improved process of finishing metal phthalocyanines in a finely-divided form exhibit-high tinctorial strength and tinctorial stability in aromatic solvents.

Crude, essentially chlorine-free copper phthalocyanine is isolated from reaction mixtures in the stable alpha crystal form. The crystals are in the form of large, long needles, which have no tinctorial strength and consequently the crude phthalocyanine has no pigmentary value.

The generally accepted method of producing a finished phthalocyanine pigment has been to subject the crude pigment to acid-pasting. This process involves dissolving the pigment in concentrated sulfuric acid, followed by drowning in water to precipitate the pigment. This procedure produces a pigmentary product in a fine state of subdivision having a particle size of the order of a fraction of a micron. In the process, the product is transformed into the unstable or beta crystal form and the shade of the blue pigment is reddish blue and the pigment has excellent tinctorial strength.

Because of the polymorphic character of the phthalocyanines, however, this unstable beta form reverts to the alpha form when exposed to aromatic solvents such as benzene or toluene which are customarily used as vehicles in paint, enamel and lacquer systems in which the color is employed as a pigment. This reversion to the alpha form causes the crystals to increase in size to such a degree that the phthalocyanine can no longer be considered a pigment as the strength is only about 20–30% of that before the transformation. Consequently, the tinctorial value of the coating composition is destroyed.

The problem of crystal growth of the phthalocyanines in aromatic solvents was solved by Wiswall, as disclosed in United States Patent No. 2,486,351, and by Loukomsky, as disclosed in United States Patent No. 2,486,304, wherein the phthalocyanine was either exposed to the action of a crystallizing liquid such as xylene or toluene and then reduced to a fine particle size by grinding with a grinding aid, followed by re-exposure to the liquid, or wherein the phthalocyanine grinding aid and the crystallizing liquid were subjected to an intensive mixing operation. In both of these processes, the crystals are converted into particles of pigment dimensions in the stable alpha form and the particles are stable to crystal growth in aromatic solvents and, therefore, the pigment may be incorporated into coating compositions containing these solvents and stored for prolonged periods of time without any change in crystal size and consequently with no diminishing of the tinctorial strength of the pigment. In the Wiswall and Loukomsky processes, the shade of the blue pigment is shifted substantially toward the green.

For many purposes, it would be desirable to produce a reddish shade of the blue pigment, such as is produced by the regular acid-pasting operation, but which can be treated so as to become stable to crystal growth in aromatic solvents without entailing a shift in shade toward the green.

The present invention relates to a process of treating metal phthalocyanines prepared by a particular process in a manner such that a noncrystallizing, red shade, beta form phthalocyanine pigment is produced.

Essentially, the process of the present invention involves preparing a slurry of a metal phthalocyanine, which has been prepared in an autoclave in a saturated alicyclic hydrocarbon solvent, and thereafter acid-pasted, and one of the stabilizing agents enumerated more fully hereinafter, heating the slurry, during which time the pigment slurry becomes thick and viscous, then thereafter filtering, washing and drying the pigment. During this treatment the pigment is swelled and perhaps there is an adsorption of the stabilizing agent as a protective coating on the pigment. The mechanism of this reaction is not understood and, therefore, the present invention is not limited to any particular theory of action. At any rate, the resulting pigment has outstanding resistance to crystallization in aromatic solvents as evidenced by the fact that the new product has even been boiled in xylene for eight hours and it has been soaked in toluene at 54° C. for over a year without any indication of loss in strength or any evidence of change in crystal form.

As such, these new pigments are ideally suited for incorporation in paints, enamels, inks, lacquers and the like, which contain aromatic solvents and such compositions may be stored indefinitely without exhibiting any substantial change in color value or loss in tinctorial strength.

The crystallization resistance possessed by the products of this invention is important when it is considered that an untreated conventionally prepared acid-pasted phthalocyanine pigment has virtually no resistance to crystallization in aromatic solvents. Such conventionally prepared pigments change crystal form in boiling xylene in less than 15 minutes with an accompanying loss of pigment strength to about 20% of their initial value. Moreover, such conventionally prepared pigments lose 50% of their strength due to change in crystal form after only 64 hours exposure in toluene at 54° C.

We have found that only those phthalocyanine pigments prepared in an autoclave in a saturated alicyclic hydrocarbon solvent, representative examples of which are cyclohexane, methylcyclohexane, dimethylcyclohexane, ethylcyclohexane, decalin, and the like, respond to the treatment disclosed herein. Phthalocyanine pigments prepared by other processes or prepared in the presence of other solvents do not appear to be stabilized against crystal growth by the disclosed treatment. It may be that the pigments prepared by the specified process are in some way unique in that they respond especially well to treatment by the present invention. At any rate, pigments prepared by other processes, when treated by the process disclosed herein, have no significant increase in resistance to crystallization in aromatic solvents, whereas phthalocyanines prepared in accordance with the specified process and treated as disclosed herein have outstanding resistance to crystallization as pointed out above.

The stabilizing agents that we have found to be effective in imparting noncrystallizing properties to the metal phthalocyanine pigments prepared as stated hereinbefore are alkylamines, such as octadecylamine, laurylamine, and hexadecylamine.

The amount of stabilizing agent used is not unduly critical. In general, we have found that good results are obtained if 1–10 parts by weight based on the weight of the pigment present are employed.

A solvent for the stabilizing agent may be used. The choice of the solvent is in no way critical except that it should be nonreactive with the stabilizing agent and should preferably have a boiling point somewhat higher than the temperature at which the reaction is carried out. Aromatic hydrocarbons such as xylene or toluene have been used with good results. Diamyl ether has also been used satisfactorily.

We have found xylene to be particularly effective in making up the pigment slurry because when it is stripped from the slurry by steam, the operation produces sufficient heat to cause completion of the reaction between the pigment and the stabilizing agent.

It is a necessary feature of the stabilization treatment of the present invention that the stabilizing agent-pigment mixture be heated. The length of time the mixture is heated is not unduly critical. In general, satisfactory results are obtained if the stabilizing agent-pigment-solvent mixture is brought to 90–110° C. and held for a time, As stated hereinabove, if xylene is used as a solvent for the stabilizing agent, the removal of the xylene by steam stripping produces the necessary heat required for the completion of the reaction. However, it has also been found that satisfactory results may be obtained by heating the pigment and stabilizing agent together at higher temperatures, such as around 140° C., in the absence of a solvent.

The pigments treated as specified in the following examples were tested for resistance to crystallization by either the boiling xylene test or exposure to toluene, or both. In the boiling xylene test, the pigment was placed in xylene which was brought to a boil. The pigment was inspected microscopically at intervals to determine if any long needle crystals of the alpha form were forming. At the end of the boiling period, the pigment was filtered from the xylene suspension, dried and ground in a Hoover muller. Ink pulldowns were then made to determine the tinctorial strength of the pigment. In the toluene test, 1 part of the pigment was suspended in 20 parts of toluene which was maintained at 54° C. From time to time the pigment was examined microscropically to determine if there had been any change in crystal form. At the end of the test, the pigment was filtered, dried and tested for strength as described above. The results were confirmed by X-ray diffraction examination to determine if there had been any reversion to the alpha crystal form.

The following examples are illustrative of the present invention, all parts being by weight unless otherwise specified.

Example 1

Two parts of copper phthalocyanine, prepared by the process disclosed in U. S. Patent No. 2,318,783, substituting methylcyclohexane as the solvent for the nitrobenzene used therein, and thereafter acid-pasted, are slurried with 50 parts of xylene and 1 part of octadecylamine. The mixture is stirred at room temperature for 45 minutes and then heated on a steam bath. 150 parts of xylene are added and the mixture boiled for 6 hours. The product is stable to the boiling xylene test. Ink pulldowns of the pigment indicate no loss in tinctorial strength, as compared to the strength of the pigment before being boiled in xylene. The final pigment exhibits the X-ray diffraction pattern of the beta crystal form.

Example 2

The procedure of Example 1 is followed, replacing the octadecylamine with laurylamine. The same solvent stable product is obtained.

Example 3

The procedure of Example 1 is followed, replacing the octadecylamine with hexadecylamine. The same solvent stable product is obtained.

The terminology used herein in referring to the alpha and beta crystal forms of phthalocyanine blue is in accordance with the nomenclature used by R. H. Kienle in Official Digest, Federation of Paint and Varnish Production Clubs, No. 300, page 48, January 1950.

This application is a division of our application, Serial No. 265,522, filed January 8, 1952.

We claim:

1. The method of producing a finely-divided, tinctorially strong, noncrystallizing, red shade, beta form, metal phthalocyanine pigment which comprises subjecting a phthalocyanine pigment prepared in an autoclave in the presence of a saturated alicyclic hydrocarbon solvent and thereafter acid-pasted, to treatment with a higher alkylamine at a temperature of about 90° C. to about 140° C. alkylamine.

2. The method as in claim 1 wherein the amine is octadecylamine.

3. The method as in claim 1 wherein the phthalocyanine is copper phthalocyanine and wherein the alicyclic hydrocarbon is decalin.

4. The method as in claim 1 wherein the phthalocyanine is copper phthalocyanine and wherein the alicyclic hydrocarbon is methylcyclohexane.

5. The method as in claim 3 wherein the amine is octadecylamine.

6. The method as in claim 4 wherein the amine is octadecylamine.

References Cited in the file of this patent

UNITED STATES PATENTS

| Number | Name | Date |
|---|---|---|
| 2,262,229 | Giambalvo | Nov. 11, 1941 |
| 2,282,006 | Sloan | May 5, 1942 |
| 2,305,379 | Detrick et al. | Dec. 15, 1942 |
| 2,556,728 | Graham | June 12, 1951 |